Figure 1:
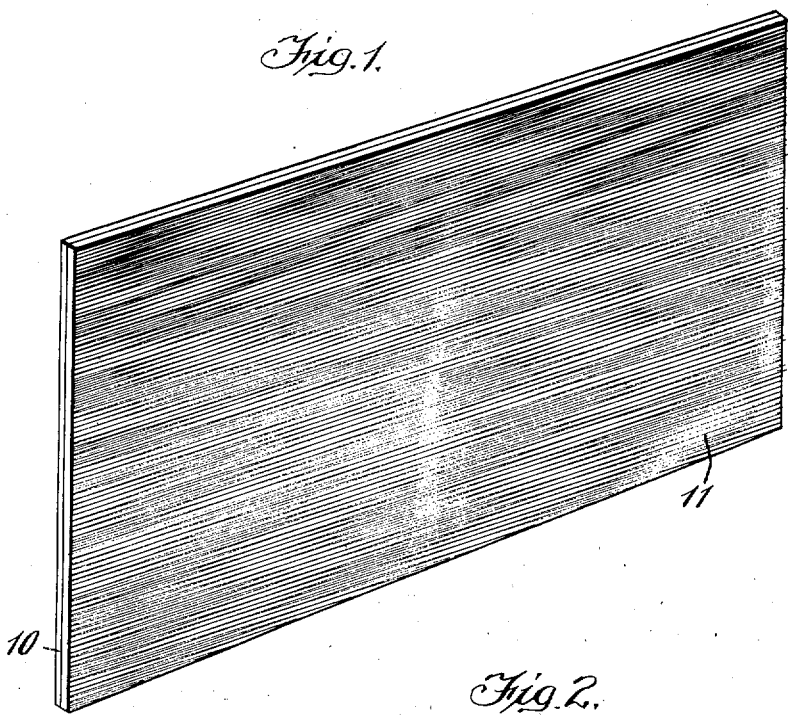

R. W. BURNETT.

WOOD VENEERED METAL.

APPLICATION FILED APR. 16, 1917.

Reissued Sept. 11, 1917.

14,349.

Witnesses:
W. H. Kilroy
Harry R. L. White

Inventor
Richard W. Burnett
By George I. Haight
Atty's

UNITED STATES PATENT OFFICE.

RICHARD W. BURNETT, OF CHICAGO, ILLINOIS.

WOOD-VENEERED METAL.

14,349. Specification of Reissued Letters Patent. Reissued Sept. 11, 1917.

Original No. 1,178,130, dated April 4, 1916, Serial No. 48,650, filed September 2, 1915. Application for reissue filed April 16, 1917. Serial No. 162,551.

*To all whom it may concern:*

Be it known that I, RICHARD W. BURNETT, a citizen of the United States, residing at Chicago, in the county of Cook and State of Illinois, have invented a certain new and useful Improvement in Wood-Veneered Metal, of which the following is a full, clear, concise, and exact description, reference being had to the accompanying drawings, forming a part of this specification.

My invention relates to improvements in wood veneered metal, and more particularly wood veneered sheet steel adapted for use in the building of interiors of cars.

For many years, numerous attempts have been made to devise a successful method of veneering sheet steel with wood so that the same might be employed in finishing the interiors of railway passenger cars. The all-steel cars or coaches are unsatisfactory in many respects, particularly on account of their heat conducting properties and the fact that it is not only expensive, but difficult to artistically finish the steel to imitate wood, and even if artistically finished, the dents or depressions originally in the sheet steel or those subsequently acquired in service, cannot be concealed and therefore mar the finish.

The object of my invention is to provide a veneered metal which will serve as a satisfactory substitute for veneered wood and which will be more desirable than an all-steel finish.

So far as I am aware, prior to my invention a successful wood veneered sheet metal has never been produced, and the reasons for this appear to reside in the fact that no proper method of forming a bond or union between the wood veneer and the sheet steel has been discovered.

I am aware that paper, oilcloth, and fabrics without "nap" or "pile" and which were necessarily saturated with the binder of glue or paste have been employed as the bonding medium between the steel and veneer, but none of these materials has been adapted to successfully compensate for the differences in the rates of expansion and contraction of the two materials, wood and steel, without breaking or destroying the union between the two outer layers and the intermediate layer of paper, oilcloth or saturated fabric.

By experiments, I have found that a satisfactory wood veneered sheet steel may be obtained by interposing a layer or strip of a textile fabric the surfaces of which are provided with a "pile" or "nap" and cementing or binding said textile fabric to both the metal sheet and the wood veneer by means of a mixture of glue and flour paste, the amount of the cementitious substance employed between each surface of the textile fabric and the metal sheet and wood veneer being merely sufficient to impregnate the free fibers or tentacles of the nap or pile, thereby leaving the main or body portion of the textile fabric with its natural elasticity and compressibility.

Figure 2:
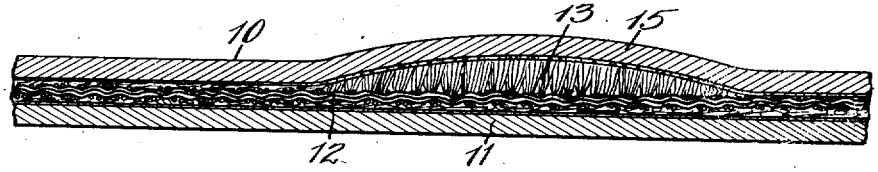

In the drawing forming a part of this specification, Figure 1 is a perspective view of a piece of a finished article embodying my invention; Fig. 2 is a sectional view of the veneered metal, upon an exaggerated scale in order to more clearly illustrate the invention; and Fig. 3 is another sectional view, also upon an enlarged scale, showing the results of attempting to separate the wood veneer and metal sheet and disclosing more particularly the action of the fibers or tentacles on the surfaces of the interposed fabric.

Figure 3:
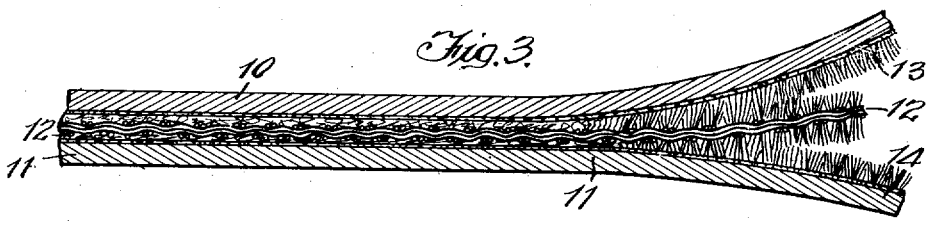

In said drawing, 10 denotes the metal sheet, usually of steel, 11 the wood veneer which may be of any suitable kind adapted for the particular purposes to which the finished product is employed, and 12 the textile fabric which is provided on that surface against the steel sheet with a pile or nap as indicated at 13 in Fig. 3. In preferable construction, the fabric 12 is also provided with a pile or nap 14 on that side attached to the wood veneer, and in practice it has been found that either "single raised flannel" or "double raised flannel" is best adapted in carrying out my invention. This fabric is loosely woven and the surface fibers are free, and the body of the fabric is naturally more or less elastic and is well adapted to yield or stretch when there is relative movement between the wood veneer and steel sheet.

By referring to Fig. 2, it will be seen that the characteristics of the interposed textile fabric which I employ are particularly adapted for the application of wood veneer to steel which has been bent or otherwise deformed as indicated at 15. As there shown, the pile fibers or tentacles of the fabric extend from the surface of the fabric to the concave surface of the steel and yet form a strong bond between the steel and the fabric.

As clearly illustrated in Fig. 3, it will be seen that any tendency of the veneer to separate from the metal sheet is strongly resisted by the multitude of fibers or tentacles which extend between the textile fabric and the wood on one side and the steel on the other. Heretofore, when paper has been used, or a fabric which has been allowed to be permeated or saturated with the binding cement and then allowed to harden, the intermediate layer has been hard or brittle, and separation between the veneer and the intermediate layer, or separation between the intermediate layer and the metal has been resisted merely along the line of separation between the two layers. With my arrangement, as clearly appears from Fig. 3, separation of any two of the layers is resisted by a multitude of the fibers extended over a relatively large area, and it is this fact which enables me to produce a thoroughly practical and serviceable veneered metal sheet.

In manufacturing the veneer, I preferably employ the following steps: The metal sheet is first coated with a thin layer of the glue and flour paste, then the fabric in its natural condition is stretched over the metal sheet whereupon the free fibers on the surface adjacent the metal sheet will receive the glue and paste, then the wood veneer is coated with another thin layer of the glue and flour paste, after which the wood veneer is applied to the exposed surface of the textile fabric. Finally, pressure is applied to insure the thorough adhesion of the parts, but in no event is the glue and flour paste applied in quantities large enough to permeate or saturate the body of the fabric.

I have found that a veneered metal sheet made in accordance with the foregoing description proves entirely satisfactory in service, the same having been used to a considerable extent on railway coaches. As so used, the veneered sheet steel possesses numerous advantages over an all-steel car in that the same does not "sweat" in hot humid climates, it is a poorer conductor of heat and hence much more to be desired, particularly in sleeping cars, it is fire-resisting, as has been demonstrated by experiment, and the wood veneer will not crack or peel from the sheet metal due to the different rates of expansion and contraction of the wood and metal, or constant vibration and jarring to which all cars are subject.

I claim:

1. As an article of manufacture, a wood veneered metal sheet which comprises, a sheet of metal, a sheet of wood veneer, and an interposed textile fabric between the metal and wood, said textile fabric being provided with nap on the surface adjacent the sheet of metal, the nap only of the fabric being united to the metal sheet by a binder substance, the body of the fabric retaining its natural elasticity, there being also a thin layer of a binder substance between and uniting the wood and the fabric.

2. As an article of manufacture, a wood veneered metal sheet which comprises, a sheet of metal, a sheet of wood veneer, and an interposed pliable fabric between the veneer and metal, said fabric being provided with a nap on its surface, the nap being united to the adjacent sheet by a cementitious substance, the body of the fabric remaining unpermeated by said cementitious substance, whereby the difference in the rate of expansion and contraction of the veneer and metal is compensated for by said fabric without rupturing the bond between either the fabric and the metal or the fabric and the veneer.

3. As an article of manufacture, a wood veneered metal sheet which comprises metal in sheet form, wood veneer in sheet form, and an interposed layer of raised flannel, the pile of the flannel being united to the adjacent materials by a binder substance, said flannel permitting slight relative movement between the wood and metal without destroying the bond therebetween.

4. As an article of manufacture, a fire-resisting veneered metal sheet which comprises, a sheet of metal, a sheet of veneer, and an interposed pliable fabric between the veneer and metal, said fabric being provided with a nap on its surface, the nap being united to the adjacent sheet by a cementitious substance, the body of the fabric remaining unpermeated by said cementitious substance whereby, the difference in the rate of expansion and contraction of the veneer and metal is compensated for by said fabric without rupturing the bond between the fabric and the members adjacent thereto.

In witness that I claim the foregoing I have hereunto subscribed my name this 10th day of March, 1917.

RICHARD W. BURNETT.